Patented Oct. 10, 1950

2,525,674

UNITED STATES PATENT OFFICE 2,525,674

BETA - (ORTHO - METHOXY)PHENYL - ISO-PROPYL 2-THENYL ALKYL AMINES AND SALTS THEREOF

Richard V. Heinzelmann, Kalamazoo, Mich., assignor to The Upjohn Company, Kalamazoo, Mich., a corporation of Michigan No Drawing. Application January 21, 1949, Serial No. 72,080

8 Claims. (Cl. 260—329)

The present invention relates to a novel series of compounds, having marked local anesthetic activity, which may be represented by the following formula:

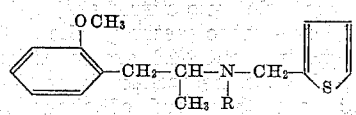

wherein R is a lower-alkyl radical containing up to and including four carbon atoms, and to the acid addition and quaternary ammonium salts thereof.

It is an object of the present invention to provide a novel series of compounds, having important physiological activity, which are especially useful in therapy as local anesthetics. The compounds are also useful in therapy as anticholinergics, antihistaminics, and for the relaxation of constricted bronchial musculature, i. e., as bronchodilators. Certain of the quaternary ammonium derivatives are also useful as surface-tension depressants, wetting agents, and the like. The provision of novel compounds having the various above-mentioned utilities is a further object of the invention. Other objects will become apparent hereinafter.

A study of the basic chemical structure of most known synthetic local anesthetics shows them to be tertiary amino-alkyl esters of amino-substituted aromatic acids. For example, some representative known local anesthetics are beta-diethylaminoethyl (para-amino)-benzoate, gamma-dibutylaminopropyl (p a r a - amino) - benzoate, alpha, beta - dimethyl - gamma - dimethylaminopropyl (para - amino) - benzoate, and gamma-(methylpiperidino)-propyl (para - amino) - benzoate. Other local anesthetics of the prior art are alkyl esters of amino-substituted aromatic acids, e. g., ethyl and butyl (para-amino)-benzoates. In contrast to the foregoing well-known ester-type anesthetics, the novel methoxyphenyl isopropyl 2-thenyl amine derivatives of the present invention have an entirely different structure, and their strong local anesthetic activity is thus entirely unexpected.

The free bases of the present invention are mobile colorless to pale amber liquids, slightly soluble in water, soluble in most common organic solvents such as methanol, ethanol, ether, chloroform, acetone, benzene and others, and form addition salts with most acids. Representative acid addition salts of the amines which may be prepared are the formate, acetate, butyrate, benzoate, succinate, salicylate, citrate, tartrate, picrate, hydrochloride, hydrobromide, hydroiodide, sulfate, phosphate, and the like. A preferred procedure for the preparation of the acid addition salts involves the admixture of anhydrous organic solutions of the amine and the acid in approximately stoichiometric proportions, in which case the salt, which is insoluble in the organic solvent, precipitates substantially as soon as it is formed. Alternatively, stoichiometric proportions of the acid and amine may merely be admixed and the solid salt obtained by evaporation to dryness. Other methods for preparing amine acid addition salts may also be used, and are known in the art.

Various other useful quaternary ammonium salts of the tertiary amines of the invention may also be prepared, as by mixing the amine with an alkyl halide, aralkyl halide, or aryl sulfonic acid ester, heating the mixture, and thereafter separating the quaternary ammonium salt of the amine. Among compounds which may be employed in such manner to prepare the quaternary ammonium salts are methyl bromide, ethyl bromide, allyl chloride, cetyl bromide, myristyl bromide, lauryl bromide, benzyl chloride, benzyl bromide, ethyl (para-toluene)-sulfonate, and the like. As before stated, the quaternary ammonium salts thus produced are also useful as surface-tension depressants and wetting agents.

When the compounds are desired to be employed as therapeutic agents, a preferred manner of oral administration is in the form of acid addition salts such as the hydrochloride, sulfate, citrate, or acetate, in which case the therapeutic agent may be combined with excipients, diluents or lubricants according to known methods of tablet manufacture. The amine salts may also be administered as an aqueous or other solution. When the free base is employed as the therapeutic agent, it may be administered by inhalation, as with a nebulizer. When employed as local anesthetics, any suitable method of application known in the art may be employed.

In addition to being useful as local anesthetics, anticholinergics, antihistaminics, bronchodilators, and, in the case of certain quaternary ammonium salts, as surface-active agents, the compounds are useful intermediates in the preparation of other therapeutically useful compounds, viz., the corresponding ortho-hydroxy substituted compounds. This conversion is accomplished, if desired, by demethylation, as with a strong acid and heat, evaporation, and isolation of the phenolic amine, either as the free base or a salt thereof according to conventional procedure.

The free base of the present invention may be prepared by adding 2-thenyl chloride to a suspension of anhydrous sodium carbonate in the particular beta-(ortho-methoxy)phenyl-isopropyl alkyl amine, e. g., the methyl, ethyl, propyl, isopropyl, butyl, isobutyl, or tertiary-butyl amine, selected as starting material, while heating the mixture at a temperature of 120 to 150 degrees centigrade over a period of from one to four hours. The isolation is conveniently accomplished by pouring the reaction mixture into water, extracting with benzene, removing the solvent, and fractionally distilling to yield the free amine. Alternatively, the benzene solution may be treated by extracting with dilute aqueous acid, basifying the resulting aqueous solution, extracting with benzene, removing the solvent, dissolving the residue in ethyl acetate, adding hydrogen chloride or other acid in alcohol, e. g., isopropanol, thereto, and recovering the amine as its acid salt. Other conventional methods of preparation, isolation, and purification, both of the free base and of the salts thereof, are satisfactory.

As will be apparent to one skilled in the art, the tertiary amine produced by the preceding process is dependent upon the particular beta-(ortho-methoxy)phenyl-isopropyl alkyl amine used as starting material. Thus, if the alkyl group in the starting secondary amine is the methyl group, the product will be beta-(ortho-methoxy)phenyl-isopropyl 2-thenyl methyl amine or a selected salt thereof. Other tertiary amine products which may be obtained in the same manner, depending upon the particular starting material, include:

Beta-(ortho-methoxy)phenyl-isopropyl 2-thenyl methyl amine,
Beta-(ortho-methoxy)phenyl-isopropyl 2-thenyl ethyl amine,
Beta-(ortho-methoxy)phenyl-isopropyl 2-thenyl propyl amine,
Beta-(ortho-methoxy)phenyl-isopropyl 2-thenyl isopropyl amine,
Beta-(ortho-methoxy)phenyl-isopropyl 2-thenyl butyl amine,
Beta-(ortho-methoxy)phenyl-isopropyl 2-thenyl isobutyl amine,
Beta-(ortho-methoxy)phenyl-isopropyl 2-thenyl secondary-butyl amine,
Beta-(ortho-methoxy)phenyl-isopropyl 2-thenyl tertiary-butyl amine, and acid addition and quaternary ammonium salts thereof, as disclosed in the foregoing.

The compound beta-(ortho-methoxy)phenyl-isopropyl isopropyl amine, an important intermediate in the preparation of one of the compounds of the present invention, is more fully described and claimed in my copending application Serial No. 72,028, filed January 21, 1949, now abandoned.

The following examples are given to illustrate the present invention, but are not to be construed as limiting.

*Example 1.—Beta-(ortho-methoxy)phenyl-isopropyl isopropyl amine*

A solution of 8.25 grams of beta-(ortho-methoxy)phenyl-isopropyl amine [J. Am. Chem. Soc. 60, 465 (1938)], and 3.2 grams of purified acetone in 75 milliliters of absolute ethanol was added to 0.1 gram of Adams' platinum catalyst which had been activated by agitation in ethanol under an atmosphere of hydrogen. The suspension was shaken under a hydrogen pressure of about three atmospheres until the reduction was complete, which, in several experiments, usually required from one to four hours. The catalyst was then removed, the residual oil, when fractionally distilled, gave beta-(ortho-methoxy)-phenyl-isopropyl isopropyl amine, distilling at 126 degrees centigrade at a pressure of ten millimeters of mercury.

The hydrochloride of the free base was prepared by adding ethereal hydrogen chloride to an ether solution of the free base, and collecting the solid hydrochloride after cooling overnight. After two crystallizations from ethanol, the beta-(ortho-methoxy)phenyl-isopropyl isopropyl amine hydrochloride melted at 172.7–173.7 degrees centigrade.

ANALYSIS

Calculated for $C_{13}H_{22}ONCl$: C, 64.04  H, 9.10  N, 5.74
Found: 63.63  8.88  5.72

*Example 2. — Beta-(ortho-methoxy)phenyl-isopropyl 2-thenyl isopropyl amine*

Thirty-three and one-half grams of 2-thenyl chloride was added to a stirred suspension of 51.7 grams of beta-(ortho-methoxy)phenyl-isopropyl isopropyl amine and 44.0 grams of anhydrous sodium carbonate, heated to about 120 degrees centigrade over a period of about one hour. Heating and stirring were continued for an additional two hours, during which time the temperature was gradually raised to 150 degrees centigrade. The reaction mixture was then cooled, water added, the aqueous suspension extracted with benzene, the benzene layer washed with water and then extracted with dilute hydrochloric acid. Three layers formed, an upper benzene layer, a middle aqueous layer, and a lower oily layer of undissolved amine hydrochloride. The benzene layer was discarded, whereafter the remaining layers were made alkaline with sodium hydroxide and extracted with benzene. The benzene extract was washed with water, the benzene removed, and the residue distilled under reduced pressure. There was thus obtained beta-(ortho-methoxy)phenyl-isopropyl 2-thenyl isopropyl amine, distilling at 151–158 degrees centigrade at a pressure of 0.05 millimeter of mercury, or at 162 degrees centigrade at a pressure of 0.08 millimeter of mercury.

The free base was converted to the hydrochloride salt by mixing solutions of the free base and hydrogen chloride in anhydrous ether. The resulting oily precipitate, after crystallization from a mixture of ethanol, ethyl acetate, and ether, melted at 119–122 degrees centigrade.

ANALYSIS

Calculated for $C_{18}H_{26}ONSCl$: C, 63.60  H, 7.71  N, 4.12
Found: 63.56  7.60  4.20

The picrate was also prepared, and when crystallized from methanol denatured ethanol, was found to melt at 127–128 degrees centigrade.

ANALYSIS

Calculated for $C_{24}H_{28}O_8N_4S$: C, 54.12  H, 5.30  N, 10.52  S, 6.02
Found: 54.03  5.33  10.80  6.09

*Example 3. — Beta-(ortho-methoxy)phenyl-isopropyl 2-thenyl methyl amine*

Twenty-eight grams of 2-thenyl chloride was added to a stirred suspension of 35.8 grams of beta-(ortho-methoxy)phenyl-isopropyl methyl amine and 32.0 grams of anhydrous sodium carbonate, heated to about 120 degrees centigrade over a period of about one hour. Heating and stirring were continued for an additional two hours, during which time the temperature was gradually raised to 150 degrees centigrade. The reaction mixture was then cooled, water added, the aqueous suspension extracted with benzene, the benzene layer washed with water and then extracted with dilute hydrochloric acid. Three layers formed, an upper benzene layer, a middle aqueous layer, and a lower oily layer of undissolved amine hydrochloride. The benzene layer was discarded, the remaining layers made alkaline with sodium hydroxide and extracted with benzene. The benzene extract was washed with water, the benzene removed, and the residue distilled under reduced pressure. There was thus obtained beta-(ortho-methoxy)phenyl-isopropyl 2-thenyl methyl amine, distilling at 191–193 degrees centigrade at a pressure of 4.5 millimeters of mercury.

The free base was converted to the hydrochloride salt by mixing solutions, in anhydrous ether, of the free base and hydrogen chloride. The resulting oily precipitate, after crystallization from a mixture of isopropanol, ethyl acetate, and ether, melted at 130.5–132 degrees centigrade.

ANALYSIS

Calculated for $C_{16}H_{22}ONSCl$: C, 61.61  H, 7.11  N, 4.49  S, 10.28
Found: 61.58  6.78  4.56  10.46

The above hydrochloride, when crystallized from a mixture of ethanol and ethyl acetate, gave a second modification melting at 131.5–134 degrees centigrade.

ANALYSIS

Calculated for $C_{16}H_{22}ONCl$: S, 10.28
Found: 10.52

A mixture of the two forms melted sharply at 182–184 degrees centigrade.

Various modifications may be made in the present invention without departing from the spirit or scope thereof, and it is to be understood that I limit myself as defined in the appended claims.

I claim:

1. A compound selected from the group consisting of (1) beta-(ortho-methoxy)phenyl-isopropyl 2-thenyl alkyl amines of the formula:

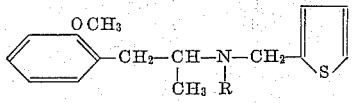

wherein R is a lower-alkyl radical containing up to and including four carbon atoms, and (2) acid addition and quaternary ammonium salts thereof.

2. An acid addition salt of beta-(ortho-methoxy)phenyl-isopropyl 2-thenyl alkyl amines of the formula:

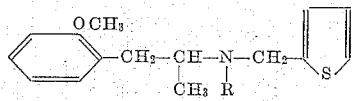

wherein R is a lower-alkyl radical containing up to and including four carbon atoms.

3. A hydrochloride addition salt of beta-(ortho-methoxy) phenyl-isopropyl 2-thenyl alkyl amines of the formula:

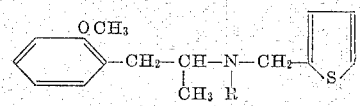

wherein R is a lower-alkyl radical containing up to and including four carbon atoms.

4. A beta-(ortho-methoxy)phenyl-isopropyl 2-thenyl alkyl amine of the formula:

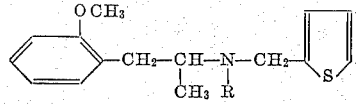

wherein R is a lower-alkyl radical containing up to and including four carbon atoms.

5. Beta - (ortho-methoxy)phenyl-isopropyl 2-thenyl methyl amine.

6. Beta - (ortho-methoxy)phenyl-isopropyl 2-thenyl methyl amine hydrochloride.

7. Beta - (ortho-methoxy)phenyl-isopropyl 2-thenyl isopropyl amine.

8. Beta - (ortho-methoxy)phenyl-isopropyl 2-thenyl isopropyl amine hydrochloride.

RICHARD V. HEINZELMANN.

REFERENCES CITED

The following references are of record in the file of this patent:

UNITED STATES PATENTS

| Number | Name | Date |
| --- | --- | --- |
| 2,317,012 | Woodruff | Apr. 20, 1943 |
| 2,317,013 | Woodruff | Apr. 20, 1943 |

OTHER REFERENCES

Alles: J. Pharm. and Exp. Therapy, 72, 265–266 (1941).